United States Patent
Krietzman et al.

[11] Patent Number: 5,649,499
[45] Date of Patent: Jul. 22, 1997

[54] ANIMAL FEEDING BOWL WITH PROTECTIVE COVER MOVABLE BY ANIMAL

[76] Inventors: Mark H. Krietzman; Yu-Hsin Chen, both of 25550 Hawthorne Blvd., Ste. 101, Torrance, Calif. 90505

[21] Appl. No.: 512,592

[22] Filed: Aug. 8, 1995

[51] Int. Cl.$^6$ .................... A01K 5/01; A01K 29/00
[52] U.S. Cl. .................... 119/52.1; 119/62; 119/55
[58] Field of Search .................... 119/51.5, 52.1, 119/52.3, 53.5, 55, 58, 59, 54, 62, 63

[56] References Cited

U.S. PATENT DOCUMENTS

| | | | |
|---|---|---|---|
| 2,791,201 | 5/1957 | Jacob, Sr. | 119/55 |
| 3,077,863 | 2/1963 | Chilovich | 119/62 |
| 3,176,656 | 4/1965 | Bates | 119/62 |
| 4,147,133 | 4/1979 | Molnar et al. | 119/55 |
| 4,175,516 | 11/1979 | Savage | 119/62 |
| 4,389,976 | 6/1983 | Novak | 119/62 |
| 4,576,118 | 3/1986 | Meadows | 119/62 |
| 4,793,290 | 12/1988 | O'Donnell | 119/62 |
| 5,222,461 | 6/1993 | Haynes | 119/62 |
| 5,349,925 | 9/1994 | Zerato et al. | 119/62 |

Primary Examiner—Gene Mancene
Assistant Examiner—Jinan Glasgow
Attorney, Agent, or Firm—John H. Vynalek

[57] ABSTRACT

A feeding bowl mounted unitarially fabricated with edges which form an angled support for the bowl. The food in the bowl is protected by a rotational or sliding cover movable by an animal to expose the food for feeding. The exposed surface of the lid may be textured to be engagable by the animal. The lid is biased so that under the condition of the lid being released by the animal the lid is urged into a position to cover the food and form a seal between the lid an bowl to prevent the intrusion of insects. The lid further protects the food from moisture and from animals and birds not capable of moving the lid.

12 Claims, 4 Drawing Sheets

ANIMAL FEEDING BOWL WITH PROTECTIVE COVER MOVABLE BY ANIMAL

TECHNICAL FIELD OF THE INVENTION

This invention relates to the art of providing protected feed for animals and more particularly to a bowl for holding food and having a cover over the bowl to protect the food from contamination and retard spoilage, the cover being movably displaced by the animal thereby exposing the food, the cover being urged into a food protective position when the animal leaves. The cover also serves to preserve the food by being a deterrent to insects (ants, snails, slugs and flies), and other animals and birds which are incapable of holding the lid open to access the food.

BACKGROUND ART

Prior solution, U.S. Pat. No. 5,349,925 ('925), seeks to provide a covered, on demand feeding device which teaches that the device does not frighten the animal by movement of the cover toward the animal during activation of the cover removal process by the animal.

However, should the animal step off the cover while eating, the cover will come toward and down on the head of the animal. Thus the teaching of this device to provide a cover which does not frighten the animal works well upon opening but the device has not solved the problem of not frightening the animal upon normal or inadvertent closing of the lid.

Some animals such as cats may not use this type of device with an overhead cover as they refuse to stick their heads under a movable item. Further, those familiar with cats may have noticed that cats are reluctant to step on something which moves downward and remains unstable.

'925 uses a complex set of exposed pivots and hinges to produce movement of the lid. As this device is used with food stuff, the filling, use and refilling may contaminate the numerous exposed pivots and hinges in a way which may interfere with the full movement and lifting of the cover from the food reservoir.

A feeding device constructed according to the teachings of the present invention solves the problem of closing of the lid without frightening the animal. If the animal steps off this device, the cover simply slides past the nose of animal without creating the trauma of a blow to the head the '925 device may produce.

The present invention simplifies the movement of the cover to the action of one simple pivot point. This single point is easier for the user to keep clean and uncontaminated.

The present device is particularly attractive to cats because it caters to the normal activity of a cat to claw or scrape at something in order to be fed. Further, because the cover of the present device simply rotates, rather than sinking down as taught by the '925 device when stepped upon by the cat, it is more stable and less likely to frighten cats.

Thus there has long been a need for an arrangement utilizing an action means which slides the lid rather that raising up the lid, especially raising the lid into a position over the food.

Further, it is desired that the action of movement be simple to avoid binding of the opening movement by any contamination. A simple single point action of the present device allows applying of a bias means to actively return the cover to a desired position to protect the remaining food.

DISCLOSURE OF THE INVENTION

Accordingly, it is an object of the present invention to provide a covered food storage and feeding device which incorporates an improved action means to allow ease of movement of the lid by the animal in order to expose the food without frightening the animal or causing concern to the animal that it might be hit or trapped by the device.

It is another object to incorporate biasing means which provides a positive return of the lid to its protecting position over any food remaining in the device when the animal releases the lid.

It is yet another object to provide a device which is easy to maintain.

It is yet another object to provide a device which when closed is not accessible to insects such as ants and flies and not accessible to birds or other animals which lack the facility to hold the lid open to expose the food inside.

The above and other objects of the present invention are achieved, according to a preferred embodiment thereof, by providing an improved combination of a feed bowl and movable lid with a single pivot point. Various biasing means may be used to urge the lid to return to a position over the feed bowl.

In the preferred embodiment, the application of a lid which rotates on a single pivot point to uncover the food further allows a biasing means to be placed under the edge of the feed bowl to shelter the biasing means from contamination.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which.

MODES FOR CARRYING OUT THE INVENTION

Figure 3:
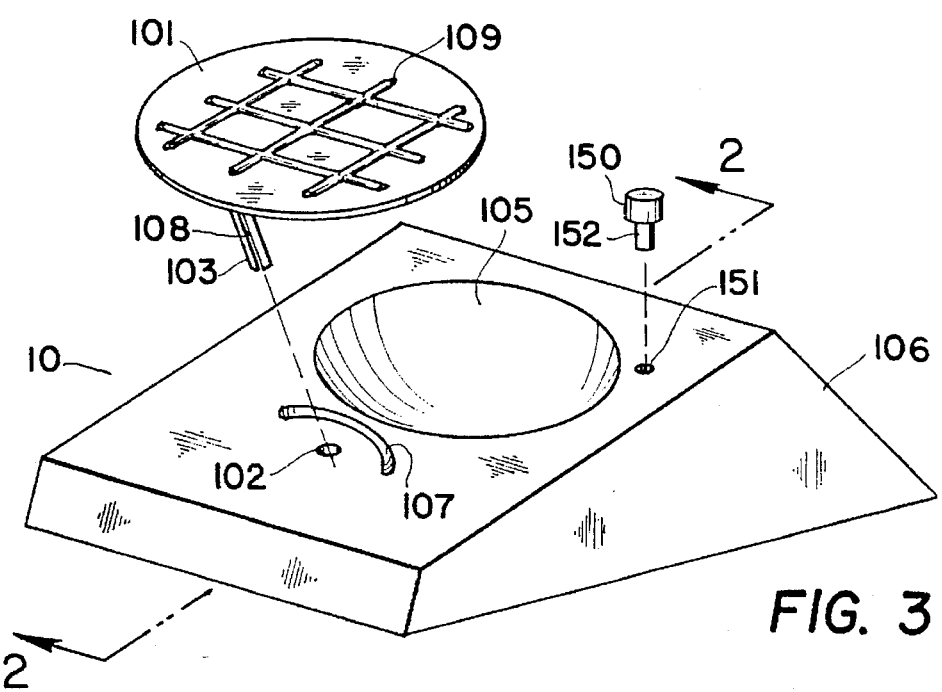
FIG. 3 represents a perspective view of the base and lid.

Referring now to the drawing, FIG. 3 shows a perspective view of the animal feed bowl with a detached cover movable by the animal according to the invention, generally designated 10.

Figure 1:
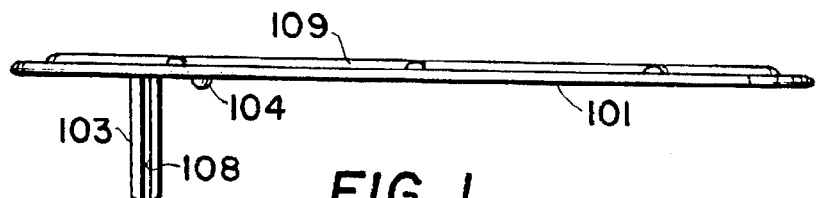
FIG. 1 represents a side view of the lid.
Figure 2:
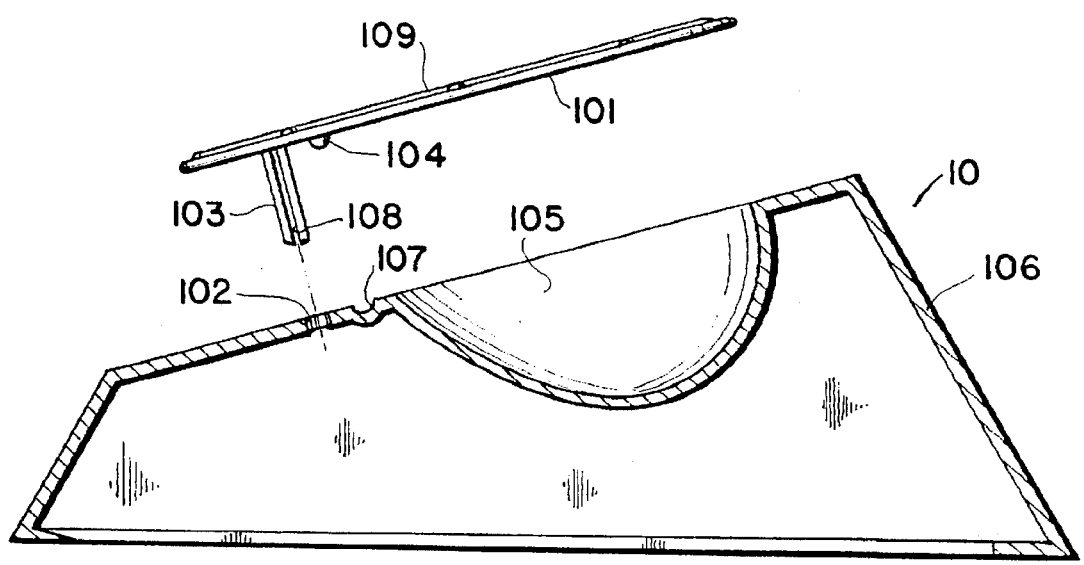
FIG. 2 represents a cross-sectional view of the base and lid of the present invention.

The bowl 105 is unitarially fabricated with extended edges which form a support 106 for the bowl 105. The bowl 105 and extend support 106 is designed to present the bowl 105 at an angle with the ground. This angle enhances the ability of the animal to move the lid 101. A bearing 102 is fabricated in the extended support 106. The placement of the bearing 102 at a low point of the support 106 near the edge of the bowl 105. This placement complements the angle of the bowl by taking advantage of ease of movement of the lid 101 with gravity rather than against gravity. A pivot rod 103 is attached to the lid 101 and is inserted through the bearing 102 thereby extending below the edge 106, as shown in FIG. 2. As shown in FIG. 1 the top surface of the lid 101 may be fabricated with a textured surface 109 to assist in engagement of the lid 101 with the paw of the animal using the device. The bottom surface of the lid 101 is fabricated without any projections which may inadvertently catch the bowl 105 or extended edge 106. The bottom surface of the lid 101 may incorporate a stop 104 which travels in the guide channel 107 formed in the support 106 to limit the movement of the lid 101 to within a preselected range of rotation. The placement of the pivot rod 103 and bearing 102 allows the lid to rotate both clockwise or counterclockwise to avoid frustration to the animal of either non-movement or only partial movement of the lid 101 to expose the bowl 105.

The pivot rod 103 may be fabricated with a biasing channel 108 to allow engagement of a biasing means to urge the lid 101 from an open position to a position to cover the bowl 105. Because the end of the pivot rod 103 and the biasing means are under the support 106, they are protected from contamination during the filling of the bowl 105 with food.

In the preferred embodiment, the linear dimensions of the bearing 102 should be extended, on the underside of the device, beyond the thickness of the material forming the bowl 105 and support 106 in order to give sufficient support to the pivot rod 103 to avoid any wobble of the lid 101 and to insure alignment of the undersurface of the lid 101 with the top of the bowl 105. This close alignment acts to seal the bowl 105 against intrusion by moisture, ants and flying insects.

A pin 150 may be mounted within a storage channel 152 formed in the support 106 at a position which will not interfere with the rotation of the lid 101. Upon initial introduction of the feeding bowl to the animal, the animal may not easily comprehend the requirement to move the protective cover to gain access to the food. A training channel 151 which will accept the pin 150 may be formed in the support 106 at a position which will allow the pin 150 to limit the rotation of the lid 101 to partially expose the food beneath the lid 101. This will encourage the animal to learn to move the lid 101 to access all of the food within the bowl 105.

Figure 4:
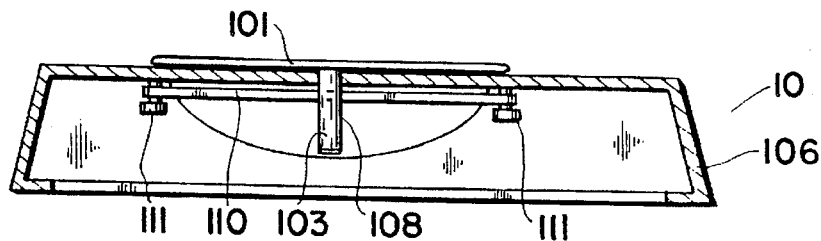
FIG. 4 represents an internal view of the biasing means mounted in the base.

FIG. 4 illustrates a biasing means mounted through the biasing channel 108 of the pivot rod 103 to urge the lid 101 to be maintained in a closed position over the bowl 105.

The biasing means is fabricated of an elastic band 110 stretched between two biasing mounting pins 111. This mechanism is simple to maintain and replace when the elastic band 110 becomes exhausted.

Figure 5:
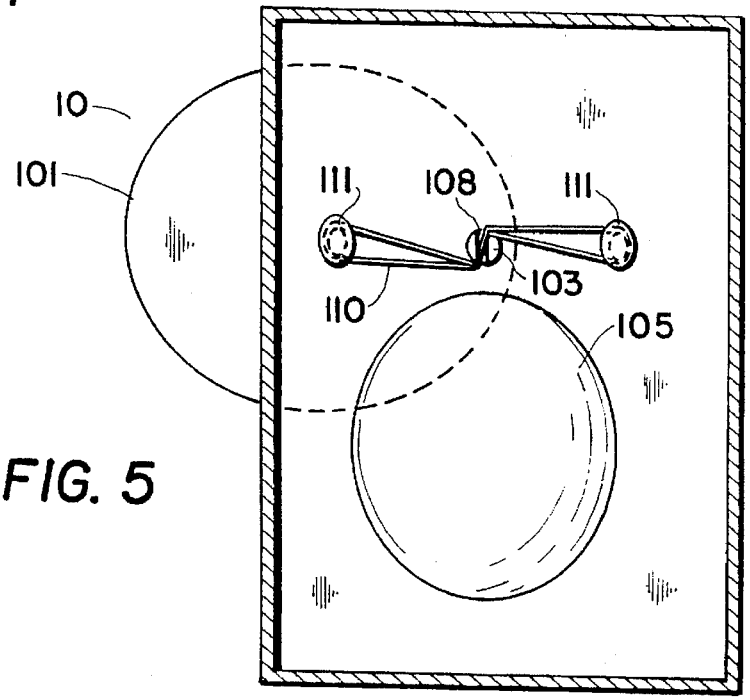
FIG. 5 represents a bottom view with the lid moved to one side showing deformation in the biasing means.

FIG. 5 illustrates the lid 101 rotated to one side thereby placing the elastic band 110 into a deformed configuration.

Figure 6:
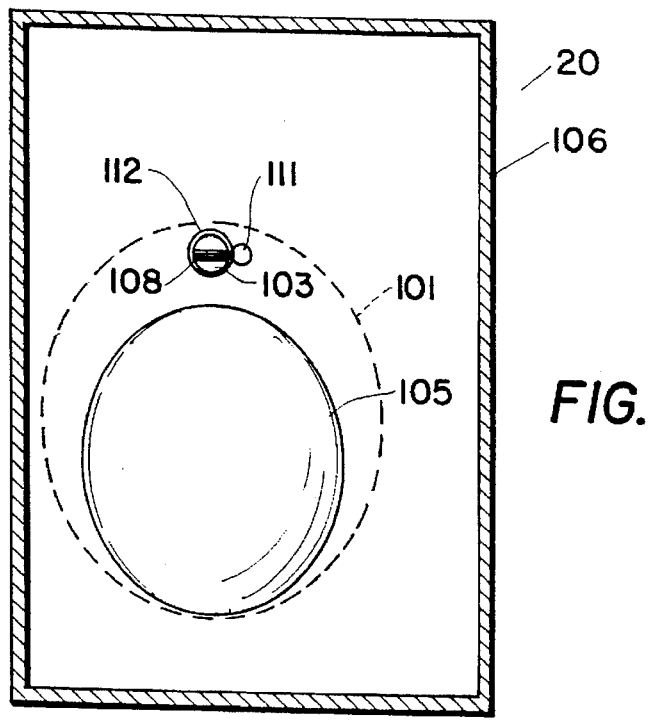
FIG. 6 represents another embodiment of a biasing means.

FIG. 6 illustrates an embodiment of the present invention, generally designated 20. The biasing means incorporates a coil spring 112 mounted on biasing pin 111 and engaging the biasing channel 108.

Figure 7:
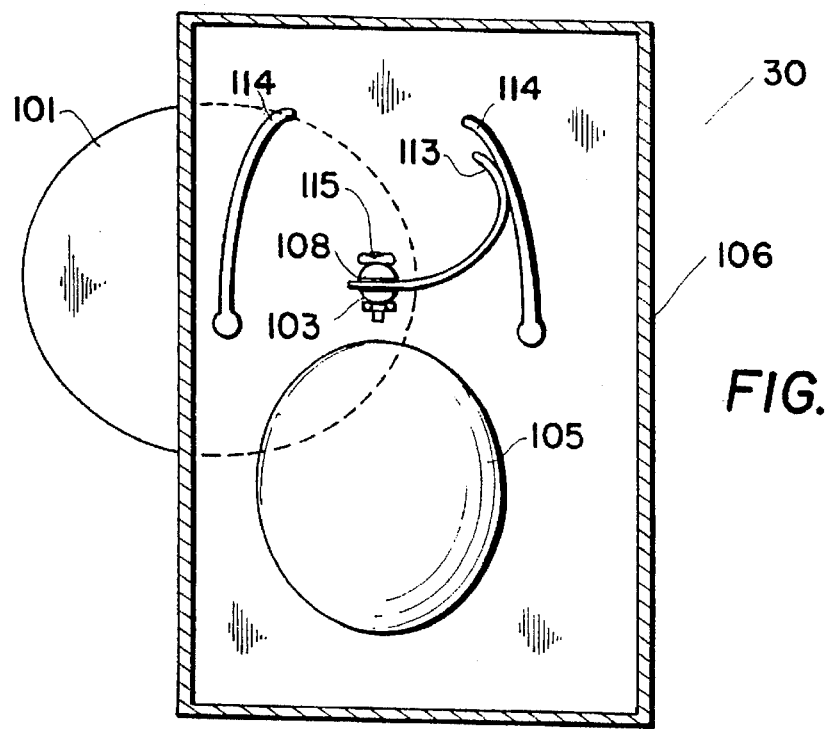
FIG. 7 represents another embodiment of a biasing means.

FIG. 7 illustrates an embodiment of the present invention, generally designated 30. The biasing means incorporates a leaf spring 113 which is deformed upon engagement with biasing barriers 114. The leaf spring 113 is held mounted in biasing channel 108 by fastener 115.

Figure 8:
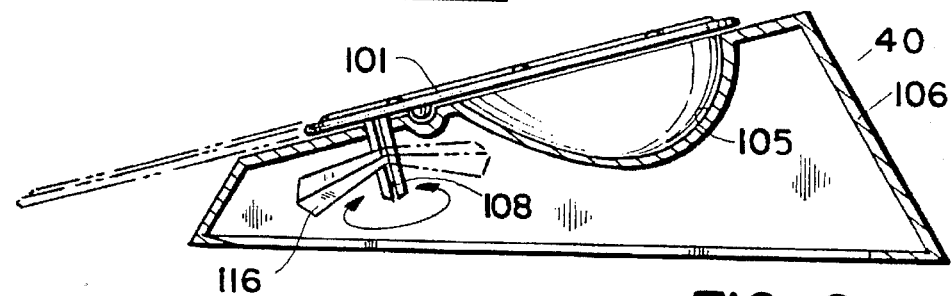
FIG. 8 represents a weighted biasing means.

FIG. 8 illustrates an embodiment of the present invention, generally designated 40. The biasing means is passive in that it is a counterweight 116 mounted in the biasing channel 108 at an orientation whereby gravity urges the lid 101 to cover the bowl 105.

Figure 9:
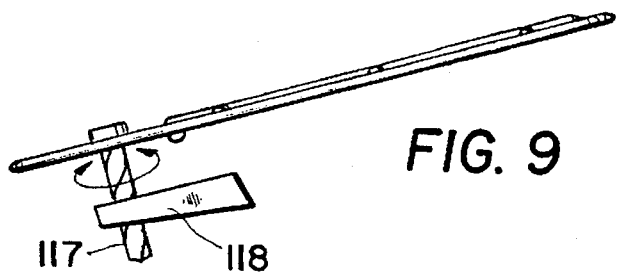
FIG. 9 represents a side view of a torsion biasing means.
Figure 10:
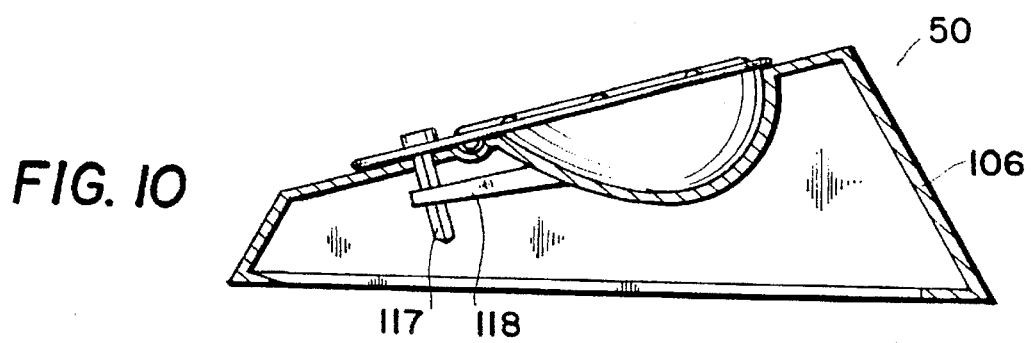
FIG. 10 represents a cross-sectional view of the torsion biasing means mounted on the base.

FIG. 10 illustrates an embodiment of the present invention, generally designated 50. The biasing means is a flexible pivot pin 117, with memory, securely mounted to the lid 101. The flexible pivot pin extends through the support 106 and is held in a non-rotating position by brace 118. The action of the flexible pivot pin 117 is illustrated in FIG. 9. Rotation of the lid 101 creates a distortion in the flexible pivot pin 117 in the form of torsion. As the flexible pivot pin 117 returns to its original shape, the torsion will urge the lid 101 to its original position over the bowl 105.

Figure 11:
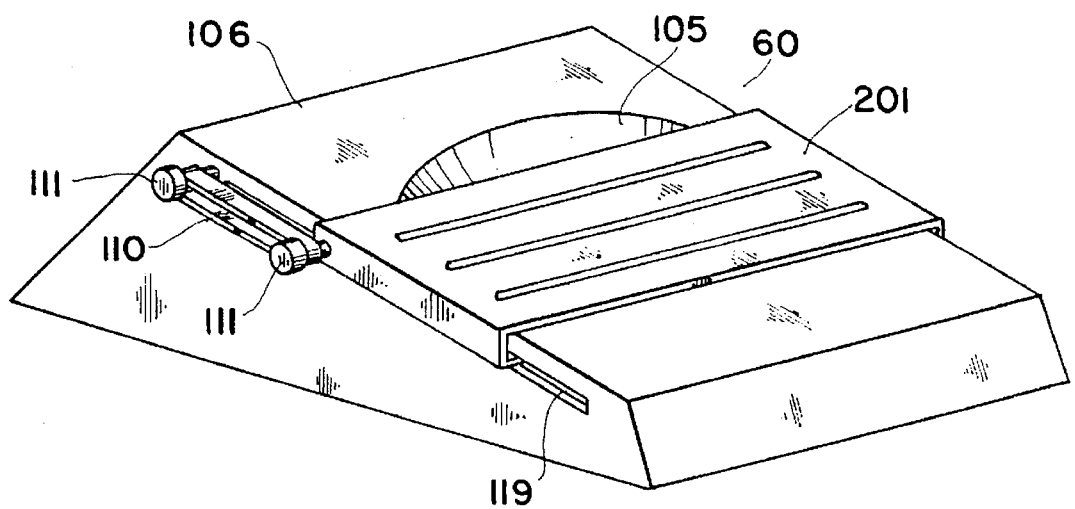
FIG. 11 represents another embodiment of a lid and biasing means.

FIG. 11 illustrates yet another embodiment of the present invention, generally designated 60. The motion of the lid 201 is linear along pilot channel 119 as apposed to the rotational motion described above. The biasing means may incorporate an elastic band 110 placed on biasing mounting pins 111 on each side of the lid 201 to urge the lid 201 into the up most position along the pilot channel 119.

Figure 12:
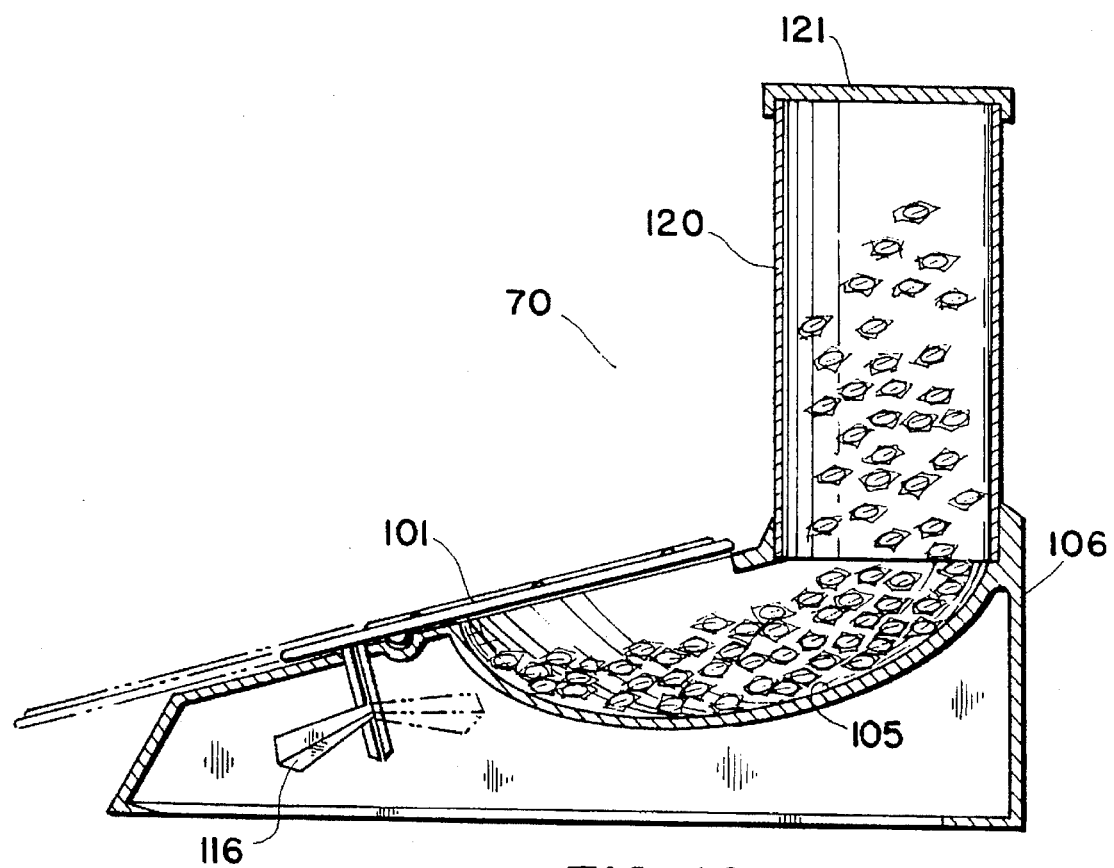
FIG. 12 represents a device with a storage bin which refills the bowl in the base of the device.

FIG. 12 illustrates yet another embodiment of the present invention, generally designated 70. For any one of the embodiments described above, the support 106 may be formed to accept the insertion of the lower end of a generally cylindrical storage bin 120 which communicates with the bowl 105. A storage bin cover 121 may be provided to seal the upper end of the storage bin 120. Extra food may be placed in the storage bin 120 to refill the bowl 105 as it is emptied by the animal.

For all of the above embodiments it is preferred to construct the device so that the lid 101 covers the bowl with only the minimum distance between the lid 101 and bowl 105 to be snug to discourage the entrance of ants, slugs, snails and/or flying insects into the bowl 105.

For all of the above embodiments it is preferred to fabricate the device from a plastic which has a natural lubrication such as DELRIN (genericaly known as acetal or polyproplyene) manufactured by DUPONT, so that do not need to add lubricant which may foul mechanism and produce a foul odor to animal.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A improved animal feeding bowl with a protective cover adapted to be openable by the animal to expose food in the bowl for feeding of the animal, and comprising, in combination:

a unitarily fabricated bowl with extended edges forming an angled support for the bowl, said support having an underside;

a bearing mounted at a preselected position in said extended edges;

a lid of a preselected shape larger than said bowl and having an underside and an exposed surface;

a pivot pin attached to said lid and mountable positioned in said bearing thereby allowing rotational movement of said lid to expose food stored in said bowl;

biasing means attached to said pivot pin at a point remote from said lid whereby said lid is urged into a position to cover and seal said bowl.

2. The arrangement defined in claim 1 wherein:

said biasing means is a rubber band detachably secured to a plurality of biasing mounting pins mounted on the underside of said angled support.

3. The arrangement defined in claim 1 wherein:

said biasing means is a coil spring detachably secured to a plurality of biasing mounting pins mounted on the underside of said angled support.

4. The arrangement defined in claim 1 further comprising:

a plurality of biasing barriers mounted on the underside of said angled support; and, wherein said biasing means is a strip spring engagable with at least one of said biasing barriers.

5. The arrangement defined in claim 1 further comprising:

a brace mounted on the underside of said angled support; and, wherein said pivot pin is fabricated of flexible material with memory to provide torsion biasing means under the condition of said pivot pin being securely held in fixed relationship to said bowl by a said brace.

6. The arrangement defined in claim 1 further comprising:

a counter weight mounted on said pivot pin below the underside of said angled support; and, wherein said biasing means is passively achieved by said counter weight seeking a low point which urges said lid into a protective position over said bowl.

7. The arrangement defined in claim 1 wherein:

said device further incorporates a covered, gravity feed storage bin communicating with said bowl to replenish the food in said bowl as it is removed by the animal.

8. The arrangement defined in claim 1 wherein:

the exposed surface of said lid is fabricated to provide a textured surface engagable by the paw of the animal.

9. The arrangement defined in claim 1 wherein:

at least the lid and angled support are fabricated from plastic with natural lubrication to ease movement of lid from a position over said bowl and allow return of lid over bowl without binding.

10. The arrangement defined in claim 1 further comprising:

a training pin; and, a training channel fabricated in said support at a preselected position whereby, under the condition of said training pin being inserted within said training channel, said training pin holds said lid in a position to partially expose said bowl and any food within thereby encouraging the animal to manipulate said lid to a more open position to gain access to the food within said bowl.

11. The arrangement defined in claim 1 further comprising:

a stop mounted on the underside of said lid; and a guide channel fabricated in said support at a position engagable by said stop whereby said stop limits the travel of said lid to the excursion of said stop within said guide channel.

12. A improved animal feeding bowl with a protective cover adapted to be openable by the animal to expose food in the bowl for feeding of the animal, and comprising, in combination:

a unitarily fabricated bowl with extended edges forming an angled support for the bowl;

a plurality of pilot channels mounted at a preselected position in said extended edges;

a lid of a preselected shape larger than said bowl formed with extended edges slideably engaged within said pilot channels thereby allowing sliding movement of said lid within said pilot channels to expose food stored in said bowl;

biasing means attached to said lid and said angled support remote from said lid whereby said lid is urged into a position to cover said bowl.

* * * * *